Patented Nov. 13, 1951

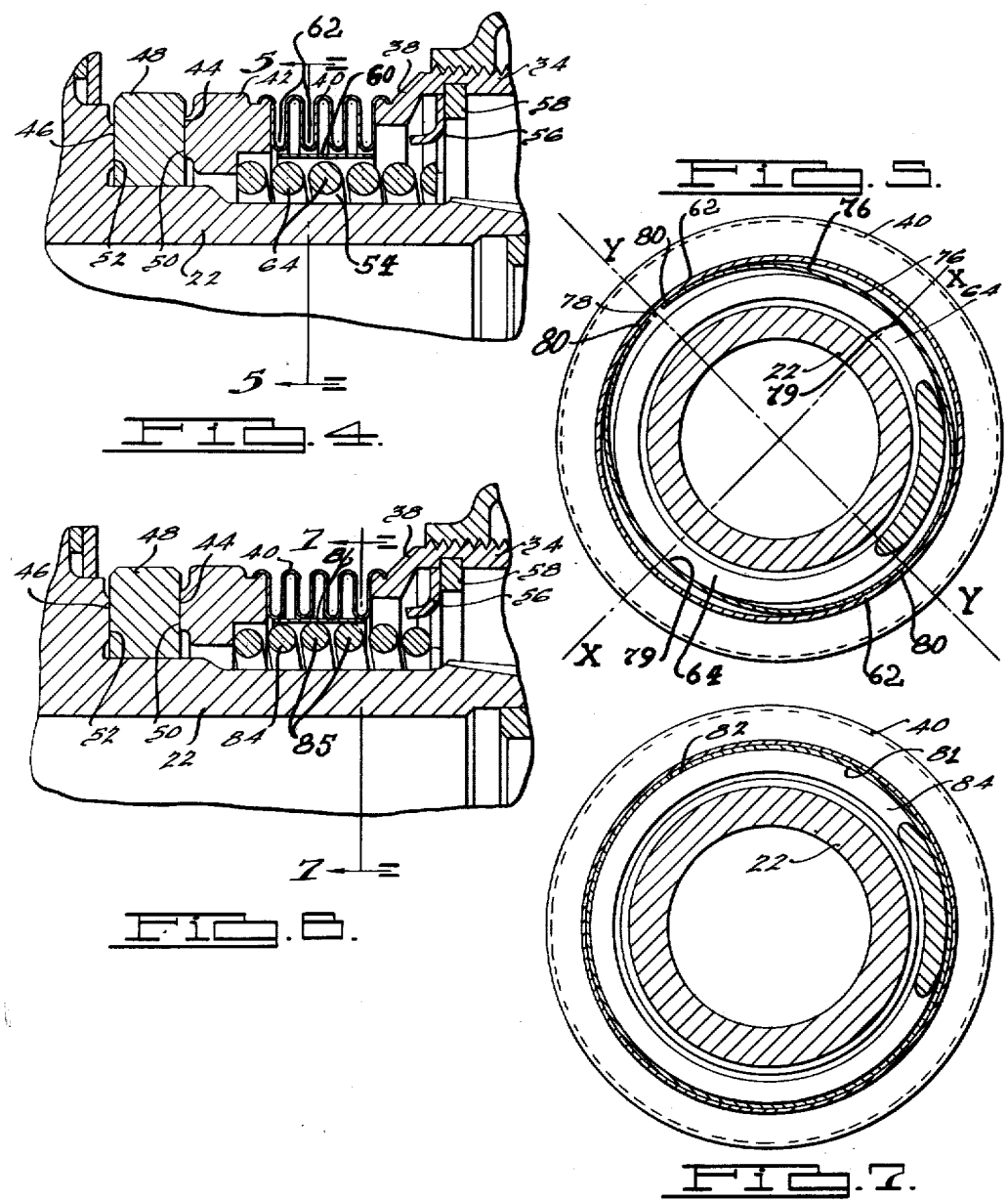

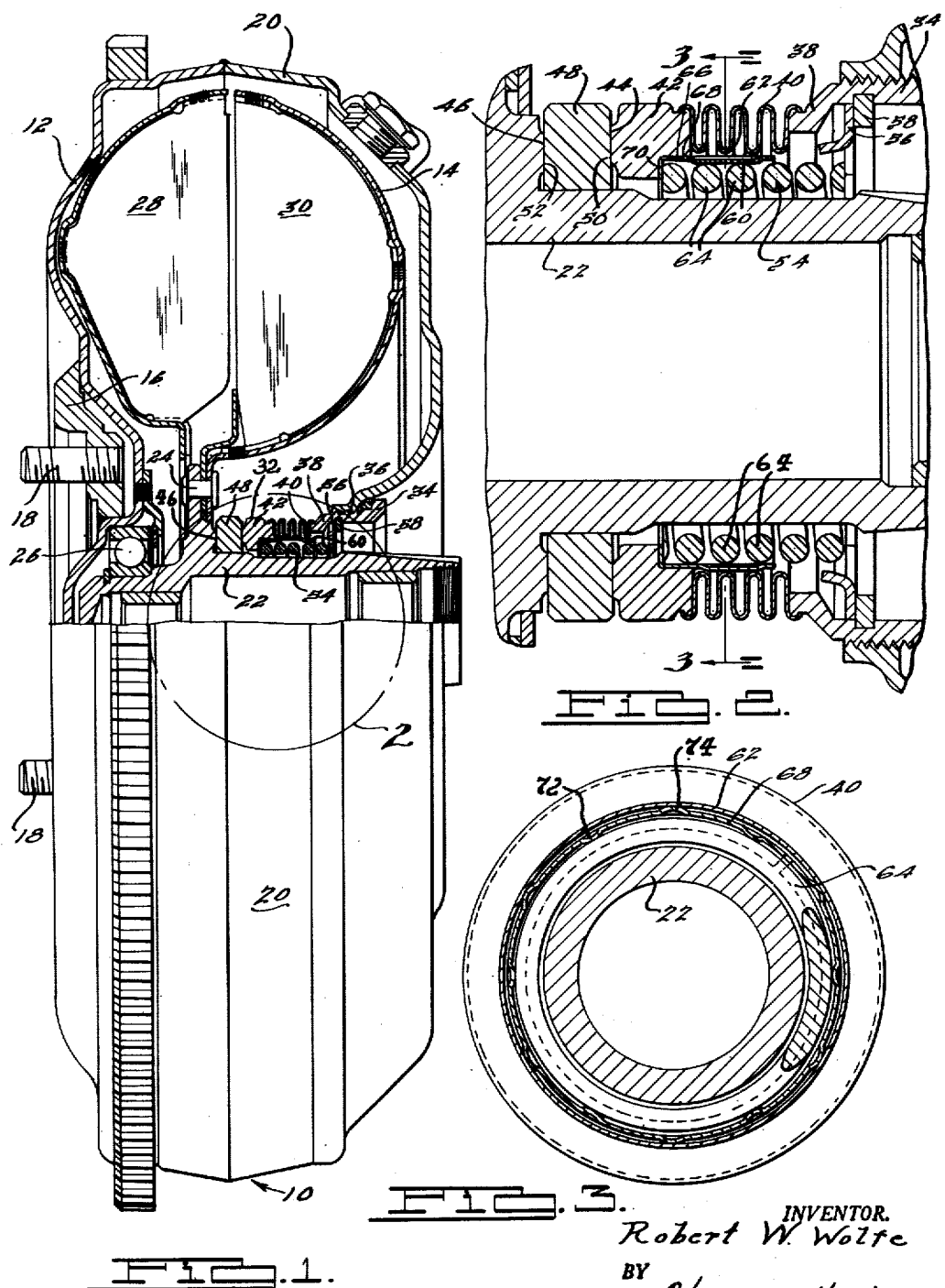

2,574,808

UNITED STATES PATENT OFFICE 2,574,808

SQUEAK INHIBITING SEAL CONSTRUCTION FOR FLUID POWER TRANSMITTING DEVICES

Robert W. Wolfe, Royal Oak, Mich., assignor to Chrysler Corporation, Highland Park, Mich., a corporation of Delaware Application October 4, 1946, Serial No. 701,200

13 Claims. (Cl. 286—11)

This invention relates to seal constructions for fluid power transmitting devices such as fluid couplings employed in automotive vehicle drives and in particular to seal constructions for such couplings embodying means for inhibiting or eliminating squeak or the like noise originating in the coupling seal during operation of the coupling.

Fluid couplings have found wide employment in automotive practice as a flexible drive connection for transmitting torque from the engine to the transmission from which it is transmitted to the vehicle driving wheels through the customary propeller shaft. In this arrangement torque is transmitted from an engine driven vaned impeller through a fluid medium to a vaned rotor runner drivingly connected to the input of the transmission. The fluid is maintained in the coupling by a housing usually part of the impeller and driven therewith, and by a pressure seal between the housing and driven shaft or hub of the runner.

In a typical seal construction the housing is provided with a flexible bellows to the end of which is secured a nose ring having a ground sealing face. The runner hub also has a ground sealing face and between these sealing faces is interposed a floating sealing ring having sealing faces for contacting with those of the runner and nose piece. A compression spring maintains the sealing faces under pressure.

Due to rotational slip between the impeller and rotor of the coupling which varies with engine power input and vehicle load, relative rotational slip takes place between the nose ring, floating ring, and runner, and in consequence thereof friction exists between the rubbing surfaces of the nose ring and floating ring and/or between the latter and the runner hub or shaft. This friction under certain conditions not exactly known but believed dependent upon the amount thereof and upon the speed of the relatively moving parts sets up longitudinal and other vibrations in the seal elements which is carried to the bellows and to some extent to the pressure spring. The bellows and spring are also set in longitudinal oscillation by slight alternate contractions and extensions of these members in operation of the coupling due to end movement of the driven shaft. Certain vibrations aforesaid are of audible frequency and these, it has been found, effect an undesirable squeak, howl, whine, or chatter. The bellows having the greatest surface area apparently is responsible for the more extensive sound waves given out by the seal construction, and these sound waves or vibrations are carried to the housing of the fluid coupling either forcibly or as resonant vibrations, and this member serves as a sounding board to accentuate the noise effect produced.

I have discovered that the difficulty may be materially alleviated and in most cases substantially eliminated by providing mechanism for mechanically damping the audible vibrations of the bellows and spring, for example, by absorbing the energy of vibration by frictional engagement of suitable means with the bellows and spring to either substantially completely stop the vibrations of these elements or to alter the vibrations or limit the vibrations to those in an inaudible range.

Hence, it is the general object of my invention to provide an improved seal construction for fluid couplings which will avoid the objections enumerated above.

A particular object is to provide an improved seal construction capable of damping out audible vibrations conducive to squeak, howl, whine, or chatter.

Another object is to provide in a fluid coupling seal means in pressure contact with the bellows and compression spring which is adapted by frictional engagement therewith to absorb the energy normally expended in causing vibratory movement of the bellows and spring, to thereby either completely damp out the vibrations of these members or at least damp out the vibrations lying in audible frequencies.

Other objects and advantages of my invention will become more apparent from the following description taken in conjunction with the accompanying drawings wherein:

Fig. 1 is a view partly in section of a conventional fluid coupling embodying my invention;

Fig. 2 is an enlarged sectional view of the circled portion 2 in Fig. 1 showing my improved seal construction;

Fig. 3 is a cross sectional view taken at 3—3 of Fig. 2;

Fig. 4 is an enlarged cross sectional view similar to that of Fig. 2 showing a modified form of inhibiting means employed in my invention;

Fig. 5 is a cross sectional view taken at 5—5 of Fig. 4;

Fig. 6 is a cross sectional view similar to that of Fig. 2 showing a further modification of my invention; and Fig. 7 is a cross sectional view taken at 7—7 of Fig. 6.

Referring to the drawings in which similar numerals refer to similar parts throughout the several views, the numeral 10 generally designates, as seen in Fig. 1, a fluid coupling of the well known kinetic type having coaxial impeller and runner structures 12 and 14 respectively. The impeller structure includes a hub 16 by which it is fastened to the engine crankshaft (not shown) of a motor vehicle, for example, by suitable studs or bolts 18 and includes a rear housing or casing 20 which completely encloses the runner 14 and provides a reservoir for coupling fluid. The runner is carried for rotation by a hollow shaft or hub 22 to which it is secured as by rivets 24. The shaft 22 is supported at its forward end by a ball bearing 26 mounted in the impeller structure 12.

The interior of the coupling is normally filled with oil or other fluid to about 80% of its capacity and this fluid is circulated by the vanes 28 and 30 of the impeller and runner respectively, through the vaned fluid circulating passages of these members respectively, thus driving the runner in the manner well known in the art to thereby provide a flexible driving connection between the engine and vehicle driving wheels through which driving torque may be transmitted.

Due to the fact that the speeds of the impeller and runner vary in accordance with power input and load and produce a so-called "slip" in the coupling, a fluid tight seal generally referred to by the numeral 32 must be provided between the housing 20 and the shaft 22.

This seal comprises a collar 34 threaded at 36 for engagement with mating threads formed in the housing 20. The collar 34 has a reduced portion 38 to which is fastened as by solder, a flexible metallic bellows 40 preferably of the well-known "Sylphon" type.

Associated with the bellows 40 is a sealing means for effecting a sealing connection between the bellows and the shaft 22. This means may comprise a contact or wear nose ring 42 attached to the forward end of the bellows by solder or other suitable means. The nose ring 42 has a ground and lapped flat surface 44 which may abut a similar flat surface 46 (see Fig. 2) formed on the shaft 22. Preferably, however, I provide a second floating wear or seal ring 48 having opposite flat surfaces 50 and 52 respectively, for contacting the surfaces 44 and 46 respectively, of the nose piece and shaft. The nose ring 42 is usually of hardened steel and the ring 48 may be of similar material or of carbon or an oil-impregnated sintered material. A helical compression spring 54 is telescopically disposed within the bellows 40 and bears against a washer 56 held by a snap ring 58 in the collar 34. This spring 54 transmits pressure to the seal rings 42 and 48 which is sufficient to prevent leakage of fluid past the running surfaces of these elements.

By reason of the "slip" between the impeller and runner in operation of the coupling, relative rotation in the nature of slip likewise takes place between the nose ring 42 and floating ring 48 and between the latter and the surface 46 of the driven shaft 22. The friction between these rubbing parts produces vibrations which set the bellows 40 in vibration and to some extent the same occurs with respect to the spring 54. The bellows and spring are also mechanically oscillated by reason of end play in the driven shaft 22. As previously stated, certain of the vibrations obtaining in the bellows and spring are of such frequency as to produce audible sound effects in the coupling and these vibrations by reason of the substantial surface area of the bellows and especially in the absence of the surrounding fluid (the fluid is at the periphery of the coupling) are conveyed to the housing 20 of the coupling which acts as a sounding board to accentuate the sound effects produced.

These noises are objectionable in the operation of a motor vehicle and to inhibit the same I provide suitable means in the nature of an annular member generally referred to by the numeral 60, preferably held stationary in an axial direction relative to either the nose ring 42 by the spring 54 and which is mounted for frictional engagement with the annular corrugations 62 of the bellows 40 and with the turns or coils 64 of the compression spring 54.

During vibration of the bellows and spring these members rub on the contacting surface of the annular ring 60 causing the energy of vibration to be expended as friction and such either completely damps out all vibration or at least reduces the vibrations to those of inaudible frequencies.

In the preferred form of my invention as seen in Figs. 2 and 3 the annular member 60 takes the form of a split thin walled ring 66 having a substantially cylindrical wall 68, one axial end of which is formed with a flange portion 70 that serves to seat this member against the nose ring 42 under biasing action of the spring 54 so as to compel this member to move axially together with the nose ring 42 and moreover to permit relative movement therewith of the annular corrugations 62 of the bellows 60 and coils 64 of the spring 54.

In order to facilitate engagement of the member 60 with the bellows and spring at as many points as is possible about the periphery of the member 60 I provide my ring 66 in the cylindrical wall 68 thereof with circumferentially spaced narrow, elongated, shallow, inner and outer protuberances or raised portions 72 and 74 respectively. As seen in Fig. 3 the protuberances are preferably uniformly spaced circumferentially about the cylindrical wall of the ring and are located alternately at the outer and inner surfaces respectively, of the cylindrical wall 68 of the ring. It will likewise be observed from Fig. 2 that the protuberances are of sufficient length axially to bridge at least a pair of annular corrugations of the bellows and a pair of coils of the compression spring. The protuberances, according to one method, may be formed by pressing out the thin cylindrical wall of the ring thereby producing shallow depressions in the surface of the wall opposite that from which the protuberance is to project. It will be understood that other suitable means of providing protuberances may be employed. In accordance with the present invention I have found that a split ring made of a half hard brass composition operates effectively to produce the intended results. It will be observed that in assembling the coupling the compression spring 54 is compressed and in so doing an expansion of its coils takes place which in turn spreads open the split ring 66 to assure good contact of the outer protuberances 74 with the annular corrugations of the bellows and also between the inner protuberances 72 and the coils 64 of the compression spring.

In the modification illustrated in Figs. 4 and 5 the annular member 60 takes the form of a split elliptical shaped ring 76, this ring being preferably split as at 78 on the major axis of the ring.

As seen in Fig. 5 the ring is so shaped that portions of the ring on or adjacent the minor axis X—X thereon are in frictional pressure contact as at 79 with the coils 64 of compression spring 54 and by reason of the additional expansive effect on the ring 60 by the compression spring 54 in assembly, portions of the ring at or adjacent the major axis Y—Y are brought into pressure frictional contact as at 80 with the annular corrugations 62 of the bellows 60, these areas of contact providing the necessary frictional surface to effect the damping action required for inhibiting noise in the coupling.

In the construction illustrated in Figs. 6 and 7 a cylindrical ring 81 split as at 82 is employed, this ring being expanded into pressure frictional contact with the bellows corrugations by a barrel-shaped compression spring 84, the central coils 85 of which, as seen in Fig. 6, press against the inner surface of the ring 81 to frictionally engage the same and likewise as stated above bring the ring into frictional engagement with the bellows 60 upon assembly of the spring 84 in the coupling. It is to be noted from Fig. 6 that the end coils of the spring 84 do not contact the ring thus permitting a geometric mounting effect to be obtained for the ring member.

While the particular squeak inhibiting seal construction herein described is well adapted for carrying out the objects of the present invention, it will be understood that various modifications, changes, and substitutions may be made without departing from the spirit thereof and the present invention is to be construed to include all such modifications, changes and substitutions as may come within the scope of the following claims.

What I claim is new and desire to protect by Letters Patent is:

1. A seal construction for a fluid power transmitting device including a vaned driving member, a vaned driven member and a housing enclosing said members and rotatable with one of said driving and driven members comprising; a bellows non-rotatably carried by said housing, sealing means carried by one end of said bellows and operative to provide a running seal connection with the other of said driving and driven members, a compression spring for resiliently biasing said sealing means to effect said sealing connection, said spring being telescopically disposed relative to said bellows and separated therefrom by an annular space, and preformed annular squeak amplification inhibiting means disposed in said annular space and simultaneously frictionally engaging said bellows and spring.

2. In a fluid coupling seal construction in combination, a pair of relatively rotatable structures, a bellows element non-rotatably carried by one of said structures, a sealing face on the other of said structures, a sealing member carried by said bellows, said member having a sealing face adapted to form a running seal connection with said sealing face of said other structure, a compression spring telescopically arranged relative to said bellows, said spring resiliently biasing said sealing member in a direction to bring said sealing faces into sealing contact with each other, and a squeak amplification inhibiting sleeve telescopically intermediate said bellows and spring and frictionally engaging each thereof during operation of the coupling.

3. In a fluid coupling seal construction in combination, a pair of relatively rotatable structures, a bellows non-rotatably carried by one of said structures, a sealing member carried by said bellows, said member having a sealing face, a sealing face on the other of said structures, a second sealing member intermediate said first mentioned sealing member and said other structure, said second sealing member having opposite sealing faces adapted to be engaged respectively with the said sealing face of said first mentioned sealing member and the said sealing face of said other structure to provide a running seal connection between said structures, a compression spring for resiliently biasing said sealing members toward said sealing face of said other structure to establish said seal connection, said spring being telescopically disposed within said bellows and separated therefrom by an annular space, and a squeak amplification inhibiting sleeve disposed in said annular space and simultaneously frictionally engaging each of said bellows and spring.

4. A seal construction for a fluid power transmitting device including a vaned driving member, a vaned driven member and a housing enclosing said members and rotatable with one of said driving and driven members comprising; a bellows non-rotatably carried by said housing, sealing means secured to one end of said bellows and operative to provide a running seal connection with the other of said driving and driven members, a compression spring for resiliently biasing said sealing means to effect said sealing connection, said spring being telescopically disposed relative to said bellows and separated therefrom by an annular space, and an expansible metallic ring-like element disposed in said annular space and simultaneously frictionally engaging said bellows and spring for inhibiting amplification of squeak developed in said running seal connection.

5. A seal construction for a fluid power transmitting device including a vaned driving member, a vaned driven member and a housing enclosing said members and rotatable with one of said driving and driven members comprising; a bellows non-rotatably carried by said housing, sealing means associated with said bellows and operative to provide a running seal connection with the other of said driving and driven members, a compression spring for resiliently biasing said sealing means to effect said sealing connection, said spring being telescopically disposed, relative to said bellows and separated therefrom by an annular space, and an oval-shaped ring disposed in said annular space, and frictionally engaging each of said bellows and spring for inhibiting amplification of squeak developed in said running seal connection during operation of said device, a portion of said ring on the major axis thereof engaging one and a portion of said ring on the minor axis thereof engaging the other.

6. A seal construction for a fluid power transmitting device including a vaned driving member, a vaned driven member and a housing enclosing said members and rotatable with one of said driving and driven members comprising; a bellows non-rotatably carried by said housing, sealing means associated with said bellows and operative to provide a running seal connection with the other of said driving and driven members, a helical wound compression spring for resiliently biasing said sealing means to effect said sealing connection, said spring having a plurality of turns thereof telescopically disposed relative to said bellows and the turns of said spring adjacent its opposite ends being of a different size from the turns thereof intermediate said ends, and squeak amplification inhibiting means telescopically disposed relative to said bellows and spring and frictionally engaged with said bellows and said intermediate turns of said spring.

7. A seal construction for a fluid power transmitting device including a vaned driving member, a vaned driven member and a housing enclosing said members and rotatable with one of said driving and driven members comprising; a bellows non-rotatably carried by said housing, sealing means associated with said bellows and operative to provide a running seal connection with the other of said driving and driven members, a compression spring for resiliently biasing said sealing means to effect said sealing connection, said spring being of barrel shape so as to provide a bulged portion and said spring being telescopically disposed within said bellows and a split ring telescopically disposed between said bellows and spring, said ring frictionally engaging said bellows and the bulged portion of said spring for inhibiting amplification of squeak developed in said running seal connection.

8. A seal construction for a fluid power transmitting device including a vaned driving member, a vaned driven member and a housing enclosing said members and rotatable with one of said driving and driven members comprising; a bellows non-rotatably carried by said housing, said bellows having a plurality of annular corrugations, sealing means associated with said bellows and operative to provide a running seal connection with the other of said driving and driven members, a helical wound compression spring for resiliently biasing said sealing means to effect said sealing connection, said spring having a plurality of coils thereof telescopically disposed relative to said bellows, and an annular squeak amplification inhibiting element telescopically disposed relative to said bellows and spring, said element having a plurality of surface protuberances in frictional engagement with corrugations of said bellows and others in frictional engagement with coils of said spring.

9. A seal construction for a fluid power transmitting device including a vaned driving member, a vaned driven member and a housing enclosing said members and rotatable with one of said driving and driven members comprising; a bellows non-rotatably carried by said housing, said bellows having a plurality of annular corrugations, sealing means associated with said bellows and operative to provide a running seal connection with the other of said driving and driven members, a helical wound compression spring for resiliently biasing said sealing means to effect said sealing connection, said spring having a plurality of coils thereof telescopically disposed within said bellows, and an annular squeak amplification inhibiting element telescopically disposed intermediate said bellows and spring, said element having outer spaced surface protuberances frictionally engaging the annular corrugations of said bellows and having inner spaced surface protuberances frictionally engaging the coils of said spring.

10. A seal construction for a fluid power transmitting device including a vaned driving member, a vaned driven member and a housing enclosing said members and rotatable with one of said driving and driven members comprising; a bellows non-rotatably carried by said housing, said bellows having a plurality of annular corrugations, sealing means associated with said bellows and operative to provide a running seal connection with the other of said driving and driven members, a helical wound compression spring for resiliently biasing said sealing means to effect said sealing connection, said spring having a plurality of turns thereof telescopically disposed intermediate said bellows and spring, said ring having a plurality of alternating inner and outer surface protuberances circumferentially disposed around said ring, certain of said outer protuberances being frictionally engaged with annular corrugations of said bellows and certain of said inner protuberances being frictionally engaged with turns of said spring for inhibiting amplification of squeak developed in said running seal connection.

11. A seal construction for a fluid coupling including a vaned driving member, a vaned driven member and a housing enclosing said members and rotatable with one of said driving and driven members comprising; a bellows non-rotatably carried by said housing, said bellows having a plurality of annular corrugations, sealing means associated with said bellows and operative to provide a running seal connection with the other of said driving and driven members, a helical wound compression spring having a plurality of turns for resiliently biasing said sealing means to effect said sealing connection, said spring being telescopically disposed within said bellows, and a split metallic ring telescopically disposed intermediate said bellows and spring, said ring having outer and inner annular surfaces each provided with a plurality of spaced axially extending narrow surface protuberances, certain of said protuberances being frictionally engaged with annular corrugations of said bellows and certain of said inner protuberances being frictionally engaged with turns of said spring for inhibiting amplification of squeak developed in said running seal connection.

12. In a fluid coupling as claimed in claim 4 wherein the said outer protuberances have a length sufficient to extend across a plurality of said annular corrugations of said bellows and the said inner protuberances have a length sufficent to extend across a plurality of turns of said spring.

13. A seal construction for a fluid coupling including a vaned driving member, a vaned driven member and a housing enclosing said members and rotatable with said driving member comprising; a bellows having a plurality of annular corrugations and having opposite open ends, one securing said bellows to said housing, the other carrying a metallic sealing ring having a sealing face on one of its ends and an annular shouldered recess in the other end, a sealing face on said driven member, a carbonaceous sealing ring coaxial with said metallic ring and having opposite sealing faces adapted to be engaged respectively with said sealing faces of said metallic sealing ring and said driven member to provide a running seal connection between said housing and driven member, a compression spring for resiliently biasing said sealing rings to establish said sealing connection, said spring being telescopically disposed within said bellows, and a thin split metallic ring having a cylindrical portion providing inner and outer annular surfaces and having a flange portion at one end thereof, the said ring being telescopically disposed relative to said bellows and spring with its flange portion seated in said metallic ring recess and between said spring and said ring and with its cylindrical portion extending between said bellows and spring, the said inner and outer surfaces presenting elongated raised portions frictionally engaged with a plurality of said bellows corrugations and with a plurality of turns of said spring.

ROBERT W. WOLFE.

REFERENCES CITED

The following references are of record in the file of this patent:

UNITED STATES PATENTS

| Number | Name | Date |
|---|---|---|
| 1,820,152 | Neal | Aug. 25, 1931 |
| 1,822,067 | Summers | Sept. 8, 1931 |
| 2,094,160 | Oldberg | Sept. 28, 1937 |
| 2,115,346 | Summers | Apr. 26, 1938 |
| 2,174,623 | Dasher | Oct. 3, 1939 |
| 2,262,687 | Little | Nov. 11, 1941 |
| 2,334,548 | Greenlee | Nov. 16, 1943 |

Certificate of Correction

Patent No. 2,574,808 November 13, 1951

ROBERT W. WOLFE

It is hereby certified that error appears in the printed specification of the above numbered patent requiring correction as follows:

Column 6, line 51, after "disposed" strike out the comma; column 8, line 6, after "disposed" insert *within said bellows, and a split ring telescopically disposed*; line 42, for the claim reference numeral "4" read *11*; line 46, for "suffiicent" read *sufficient*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*